United States Patent
Stenqvist et al.

(10) Patent No.: US 12,158,095 B2
(45) Date of Patent: Dec. 3, 2024

(54) METHOD AND SYSTEM FOR SENSOR ANALYSIS IN AN EXHAUST GAS AFTERTREATMENT SYSTEM

(71) Applicant: VOLVO TRUCK CORPORATION, Gothenburg (SE)

(72) Inventors: Dan Stenqvist, Västra Frölunda (SE); Gustaf Lindberg, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/057,806

(22) Filed: Nov. 22, 2022

(65) Prior Publication Data

US 2023/0167759 A1    Jun. 1, 2023

(30) Foreign Application Priority Data

Nov. 30, 2021 (EP) .................... 21211255

(51) Int. Cl.
*F01N 3/20* (2006.01)

(52) U.S. Cl.
CPC .......... *F01N 3/208* (2013.01); *F01N 3/2093* (2013.01); *F01N 2900/0416* (2013.01); *F01N 2900/08* (2013.01)

(58) Field of Classification Search
CPC .... F01N 3/2066; F01N 3/208; F01N 2610/02; F01N 3/2093; F01N 11/00; F01N 2560/026; F01N 2560/14; F01N 2900/0416; F01N 2900/08; F01N 2900/1402; Y02A 50/20; Y02T 10/12
See application file for complete search history.

(56) References Cited

U.S. PATENT DOCUMENTS

| | | | |
|---|---|---|---|
| 2013/0298655 A1 | 11/2013 | Kowalkowski et al. | |
| 2014/0301925 A1* | 10/2014 | Korpics | F01N 3/2066 |
| | | | 423/212 |
| 2017/0130629 A1 | 5/2017 | Nagel et al. | |
| 2021/0033041 A1 | 2/2021 | Sommansson et al. | |

FOREIGN PATENT DOCUMENTS

| | | |
|---|---|---|
| CN | 112412599 A | 2/2021 |
| DE | 102011077251 B3 | 6/2012 |
| WO | 2011126429 A1 | 10/2011 |

OTHER PUBLICATIONS

Extended European Search Report in corresponding European Application No. 21211255.1 dated May 6, 2022 (10 pages).

\* cited by examiner

*Primary Examiner* — Phutthiwat Wongwian
*Assistant Examiner* — Diem T Tran
(74) *Attorney, Agent, or Firm* — Venable LLP; Jeffri A. Kaminski

(57) ABSTRACT

A computer implemented method to performing sensor analysis in an exhaust gas aftertreatment system (EATS) coupled downstream of an internal combustion engine (ICE). The methodology is specifically adapted for determining a scale factor for a NOx sensor that is arranged downstream of a position where an amount of a reductant is injected into exhaust gases from the ICE.

10 Claims, 3 Drawing Sheets

METHOD AND SYSTEM FOR SENSOR ANALYSIS IN AN EXHAUST GAS AFTERTREATMENT SYSTEM

TECHNICAL FIELD

The present disclosure generally relates to a computer implemented method that has been implemented with the intention to perform sensor analysis in an exhaust gas aftertreatment system (EATS) coupled downstream of an internal combustion engine (ICE). The disclosed methodology is specifically adapted for determining a scale factor for a NOx sensor that is arranged downstream of a position where an amount of a reductant is injected into exhaust gases from the ICE. The present disclosure also relates to a corresponding engine system and a computer program product.

BACKGROUND

There is an ongoing development for reducing emissions in a vehicle, such as a truck, comprising a diesel-based combustion engine. A diesel engine has an efficiency of up to about 52% and is thus the best converter of fossil energy. The high efficiency is however only possible at an elevated combustion temperature at which high levels of oxides of nitrogen (NOx) are inevitable, generally in combination with particulate matter (PM), in exhaust gases from the diesel engine.

Reducing (NOx) and particulate matter (PM) in the exhaust gases has become a very important problem in view of the protection of environment and the saving of finite fossil energy supply and current legal emission requirements generally dictate emission control, whereby exhaust gas aftertreatment systems (EATS) are necessary. Usually, such an EATS comprises a Diesel Oxidation Catalyst (DOC), a particulate filter (DPF) and a Selective Catalytic Reduction (SCR) for reducing NOx emissions.

In the SCR, a catalyst is used to convert the unwanted NOx-molecules into e.g. diatomic nitrogen (N2) and water (H2O). To provide a reductant for such a process, a popular choice is to provide e.g. urea (also known as carbamide) among the exhaust gases. Due to the high temperature of the exhaust gases, the urea will thermally decompose into ammonia and carbon dioxide ($CO_2$), and the ammonia ($NH_3$) may then react with the NOx-molecules to achieve the above desired conversion of the NOx-molecules into e.g. nitrogen and water. To provide the reductant, a reductant dosing system usually includes a reductant injector which creates a spray of reductant (e.g. a mixture of urea and water, also referred to as e.g. Diesel Exhaust Fluid, DEF) into the exhaust system of the engine, upstream of the SCR catalyst.

The EATS functions as soon as exhaust gas temperatures are above around 200°-250° deg. C. However, ensuring that the EATS functions in an optimal manner is complicated and it is problematic to ensure that only a minimal level of NOx is released into the environment. To ensure that the EATS operates in an environmentally optimal manner it is necessary for NOx sensors used with the EATS to function properly. Failure of such sensors, e.g., due to problems/end of life, will greatly influence the function of the EATS.

An exemplary implementation of investigating the reliability of measurements from NOx sensors is presented in WO2011126429. WO2011126429 applies a diagnosis scheme for determining a state of a NOx sensor in an exhaust system of a motor vehicle. Specifically, the diagnosis scheme operates by stepped raising of the NOx concentrations upstream and downstream of the catalyst. By locking urea dosage to the SCR catalyst in all variables except mass flow it is possible for existing ammonia in the catalyst to be consumed by taking at least one NOx step. By thereafter effecting further NOx steps and comparing emission parameters determined at the first sensor situated upstream of the catalyst with emission parameters at a second sensor situated downstream of the catalyst it is possible to determine any gain error and offset error of the NOx sensor.

Even though WO2011126429 improves the overall ability to diagnose how well the NOx sensors comprised with the EATS are behaving, there appears to be room for further improvements, specifically taking into account the ability to perform such diagnosis also with an even higher reliability.

Further attention is drawn to US2017130629, disclosing a method for checking the plausibility of a NOx sensor in an SCR catalytic converter system.

SUMMARY

In accordance to an aspect of the present disclosure, the above is at least partly alleviated by means of a computer implemented method for sensor analysis in an exhaust gas aftertreatment system (EATS), wherein the EATS is coupled downstream of an internal combustion engine (ICE) and provided for treating exhaust gases from the ICE, and the EATS or the ICE comprises a processing unit, wherein the method comprises dosing, under control of the processing unit, a first amount of a reductant into the exhaust gases at a first position upstream of a first nitrogen oxide (NOx) sensor comprised with the EATS when operating the ICE at a first constant flow of NOx (such as at a constant torque and constant revolutions per minute to generate the first constant flow of NOx), receiving, at the processing unit, a first set of measurement data from the first NOx sensor indicative of an amount of NOx in the exhaust gases at the position of the first NOx sensor, dosing, under control of the processing unit, a second amount of the reductant into the exhaust gases at the first position when operating the ICE at the first constant flow of NOx, receiving, at the processing unit, a second set of measurement data from the first NOx sensor indicative of an amount of NOx in the exhaust gases at the position of the first NOx sensor, and determining, using the processing unit, a scale factor for the first NOx sensor based on a combination of the first amount of the reductant, the second amount of the reductant, the first set of measurement data, the second set of measurement data, and a predefined NOx conversion ratio for the first and the second amount of the reductant.

The present disclosure is based around the desire to allow for an improved methodology for determining possible issues with a NOx sensor comprised with an exhaust gas aftertreatment system (EATS), where this NOx sensor (denoted as a first NOx sensor) is arranged downstream of the first position where the reductant has been dosed into the exhaust gases from the ICE. Such possible issues are in line with the present disclosure focused on if the first NOx sensor has some form of inherent scale factor included with measurement data that is formed by the first NOx sensor during operation of the ICE. Specifically, in accordance with the present disclosure the ICE will be arranged to operate at a first essentially constant flow of NOx. This can for example be achieved by operating the ICE at a constant revolutions per minute (RPM) and a constant torque, whereby the ICE produces a constant amount of NOx per time unit. Other possibilities exist and are considered within the scope of the present disclosure.

In an embodiment, the SCR of the EATS is coupled downstream of the ICE and is provided for treating exhaust gases from the ICE, the EATS comprises a first nitrogen oxide (NOx) sensor arranged downstream of the SCR, and the EATS comprise a urea injector arranged at the first position upstream of the SCR.

While operating the ICE at the first essentially constant flow of NOx, two sets of measurement data (first and second) are received, in sequence, from the first NOx sensor.

The first set of measurement data is received when a first amount of a reductant, such as for example urea, is dosed into the exhaust gases. It should here by understood that the expression "dosing a first amount of a reductant" should be interpreted as dosing (or injecting) a first amount of the reductant per set time unit (e.g. possibly defined as grams of urea per second) into the exhaust gases.

Similarly, the second set of measurement data is received when a second amount of the is dosed into the exhaust gases. It is desirable that the first and the second amount of the reductant differs to such an extent that it has an effect on the NOx in the exhaust gases. That is, the first and the second amount of the reductant should differ enough for the difference in the amount of NOx measured by the first NOx sensor to be measurable when the first and the second amount of the reductant is dosed into the exhaust gases.

It may also, at least in some embodiments, be desirable to introduce a waiting period between when the first and the second amount of the reductant is dosed into the exhaust gases, to ensure that the measurements from the first NOx sensor is stabilized. It may also or as an alternative be possible to introduce a filtering function to over time average the measurement data from the first NOx sensor, i.e. in relation to the first and the second set of measurement data.

In one embodiment the second amount of the reductant is higher than the first amount of the reductant. However, it may of course be possible to start with a higher amount and then lower the amount of the reductant dosed into the exhaust gases. In one possible embodiment the first amount of the reductant is zero. Again, it may also be possible in another embodiment to allow the second amount of the reductant to be zero.

Once the processing unit has received the first and the second set of measurement data from the first NOx sensor it is possible to proceed with the determination of the scale factor. This is achieved, in accordance with the present disclosure, by applying a calculation scheme where a combination of the first amount of the reductant, the second amount of the reductant, the first set of measurement data, the second set of measurement data, and a predefined NOx conversion ratio for the first and the second amount of the reductant is taken into account.

The NOx conversion ratio will in line with the present disclosure be predefined for the process of determining the scale factor. That said, the NOx conversion ratio may of course be different based on for example construction and implementation of the EATS, such as based upon a structure of a catalyst comprised with the EATS. Such a catalyst may for example be defined as a selective catalytic reduction (SCR) arrangement, where the first sensor is arranged downstream of the SCR as seen from the perspective of the ICE. Of course, the NOx conversion ratio can here be dependent on an SCR catalyst comprised with the SCR. SCR catalysts are generally made from various porous ceramic materials used as a support, such as titanium oxide, and active catalytic components are usually either oxides of base metals (such as vanadium, molybdenum and tungsten), zeolites, or various precious metals.

In one exemplary embodiment the NOx conversion ratio is set to 1/2 for a set SCR conversion efficiency of 80% with a preselected reductant, here urea, with a predefined mixture of urea and water. An example of such a known and useful mixture is Automotive urea AdBlue, or Diesel Exhaust Fluid (DEF), where the aqueous urea solution is 32.5%. In this exemplary embodiment there is needed two parts urea by weight to remove one part by weight of NOx.

As defined above, the calculation scheme will thus accordingly combine the knowledge of the first amount of the reductant, the second amount of the reductant, the first set of measurement data, the second set of measurement data, and the predefined NOx conversion ratio for the first and the second amount of the reductant.

In an exemplary embodiment for determining the scale factor, the calculation scheme will thus be able to determine a "slope" for how the amount of NOx is differing from when the first set of measurement data received to when the second set of measurement data is received. That is, the processing unit will be able to determine how the EATS should have been expected to process the NOx comprised with the exhaust gases for the known first and second amount of the reductant, in combination with the NOx conversion ratio. These "expected" values (i.e. for the first and the second amount of the reductant) can then be compared to the "real" (i.e. first and second) measurement data received from the first NOx sensor. The comparison, i.e. when comparing the first and second expected values with the first and second real measurement data will form the above mentioned slope. The slope in turn is a direct representation of the scale factor.

Advantages following by means of the present disclosure thus include a distinct and highly reliable scheme for investigating if the first NOx sensor is behaving correctly or incorrectly. If behaving incorrectly, such as if the scale factor is determined to be outside of a desirable range (such as above 1.2 or below 0.8), then it may be desirable to replace or repair the first NOx sensor. It could also, within the scope of the present disclosure, be possible to apply a compensation to the scale factor for the first NOx sensor if such a compensation is determined to be e.g. in line with legal requirements for the EATS.

The processing used for controlling the operation of the sensor analysis may in one embodiment be an electronic control unit (ECU), also used at least in part for controlling functions in relation to the ICE. However, at least one portion of the functionality of the processing unit may in some alternative embodiments be performed using a remote server such as a server arranged in a repair shop or even arranged remote from such a repair shop. In one embodiment the server could be a cloud server, where the cloud server being network connected to an/the electronic control unit (ECU) provided in conjunction with the ICE. As such, it could be possible to allow the sensor analysis as well as the result of the sensor analysis to be shared between different ICE implementations.

In some embodiments of the present disclosure, it may also be possible to determine a scale factor for a second NOx sensor, where the second NOx sensor is arranged upstream of the first position as previously defined. Accordingly, the second NOx sensor will in a general embodiment be arranged to measure the NOx level within the exhaust gases prior to that the reductant has been dosed to the exhaust gases from the ICE, as compared to the first NOx sensor where the first NOx sensor will measure the NOx level within the exhaust gases subsequent to that the reductant has been dosed to the exhaust gases from the ICE.

In such an embodiment the method has been further arranged to comprise the steps of receiving, at the processing unit, a third set of measurement data from the second NOx sensor indicative of an amount of NOx in the exhaust gases at the position of the second NOx sensor when operating the ICE at the first constant flow of NOx and dosing the first amount of the reductant, receiving, at the processing unit, a fourth set of measurement data from the second NOx sensor indicative of an amount of NOx in the exhaust gases at the position of the second NOx sensor and a fifth set of measurement data from the first NOx sensor indicative of an amount of NOx in the exhaust gases at the position of the first NOx sensor when operating the ICE at a second constant flow of NOx and dosing the first amount of the reductant, and determining, using the processing unit, a scale factor for the second NOx sensor based on a combination of the first amount of the reductant, the third set of measurement data, the fourth set of measurement data, the fifth set of measurement data, and the scale factor for the first NOx sensor. In this embodiment the first amount of the reductant is zero.

In accordance with such an embodiment of the present disclosure, the processing unit will further expand the above discussed calculation scheme. The processing unit will here have previous knowledge of the amount of NOx measured at the first sensor when operating the ICE at the first constant flow of NOx and dosing the first amount of the reductant, i.e. no reductant. This information is further combined, in the expanded calculation scheme, with the third, fourth and fifth set of measurement data. The third measurement data from the second NOx sensor will relate to the previous knowledge of the amount of NOx generated at the first sensor when operating the ICE at the first constant flow of NOx and dosing the first amount of the reductant. Correspondingly, the fourth set of measurement data from the second NOx sensor will relate to the fifth set of measurement data from the first NOx sensor when operating the ICE at the second constant flow of NOx and dosing the first amount of the reductant. Here the second constant flow of NOx is different from the first flow of NOx. Preferably the second constant flow of NOx is higher or lower than the first constant flow of NOx to form a distinct measurement difference at the first and the second NOx sensor.

The processing unit is then able to determine a scale relation between the first and the second NOx sensor. This scale relation is then normalized using the scale factor for the first NOx sensor, thereby allowing for the determination of the scale factor for the second NOx sensor. By means of such an implementation it is accordingly made possible to identify the scale factor for both the first and the second NOx sensor comprised with the EATS. As above, in case the scale factor for the second NOx sensor is determined to be outside of a desirable range (such as above 1.2 or below 0.8), then it may be desirable to replace or repair the second NOx sensor). It could also, within the scope of the present disclosure, be possible to apply a compensation to the scale factor for the second NOx sensor if such a compensation is determined to be e.g. in line with legal requirements for the EATS.

According to another aspect of the present disclosure, there is provided an engine system, comprising an internal combustion engine (ICE), an exhaust gas aftertreatment system (EATS) coupled downstream of the ICE and provided for treating exhaust gases from the ICE, a first nitrogen oxide (NOx) sensor, and a processing unit, wherein the processing unit is arranged to dose a first amount of a reductant into the exhaust gases at a first position upstream of a first nitrogen oxide (NOx) sensor comprised with the EATS when operating the ICE at a first constant flow of NOx, receive a first set of measurement data from the first NOx sensor indicative of an amount of NOx in the exhaust gases at the position of the first NOx sensor, dose a second amount of the reductant into the exhaust gases at the first position when operating the ICE at the first constant flow of NOx, receive a second set of measurement data from the first NOx sensor indicative of an amount of NOx in the exhaust gases at the position of the first NOx sensor, and determine a scale factor for the first NOx sensor based on a combination of the first amount of the reductant, the second amount of the reductant, the first set of measurement data, the second set of measurement data, and a predefined NOx conversion ratio for the first and the second amount of the reductant. This aspect of the present disclosure provides similar advantages as discussed above in relation to the previous aspect of the present disclosure.

Further effects and features of the present computer implemented method are similar to what has been presented above in relation to the previous aspect of the present disclosure.

Furthermore, the engine system as presented above may in some embodiments be a component of a vehicle, further comprising the above-mentioned ICE/EATS combination. Such a vehicle may in turn for example be at least one of a truck, a bus, a car and a working machine. The engine system is however also useful in other applications where the ICE/EATS combination is used for other purposes than propelling a vehicle. An example of such an implementation is an electric generator comprising an ICE EATS combination. The ICE is in turn generally a diesel-powered engine or a spark-ignition (SI) ICE powered by hydrogen. It should be understood that other applications are possible, such as in relation to any kind of vessel, including for example a marine vessel. It should also be understood that the present invention is relevant in relation to other internal combustion engines than diesel and hydrogen engines.

According to an additional aspect of the present disclosure, there is provided a computer program product comprising a non-transitory computer readable medium having stored thereon computer program means for sensor analysis in an exhaust gas aftertreatment system (EATS), wherein the EATS is coupled downstream of an internal combustion engine (ICE) and provided for treating exhaust gases from the ICE, and the EATS or the ICE comprises a processing unit, wherein the computer program product comprises code for dosing, under control of the processing unit, a first amount of a reductant into the exhaust gases at a first position upstream of a first nitrogen oxide (NOx) sensor comprised with the EATS when operating the ICE at a first constant flow of NOx, code for receiving, at the processing unit, a first set of measurement data from the first NOx sensor indicative of an amount of NOx in the exhaust gases at the position of the first NOx sensor, code for dosing, under control of the processing unit, a second amount of the reductant into the exhaust gases at the first position when operating the ICE at the first constant flow of NOx, code for receiving, at the processing unit, a second set of measurement data from the first NOx sensor indicative of an amount of NOx in the exhaust gases at the position of the first NOx sensor, and code for determining, using the processing unit, a scale factor for the first NOx sensor based on a combination of the first amount of the reductant, the second amount of the reductant, the first set of measurement data, the second set of measurement data, and a predefined NOx conversion ratio for the first and the second amount of the reductant. Also this aspect of the present disclosure provides similar advantages as discussed above in relation to the previous aspects of the present disclosure.

A software executed by the server for operation in accordance with the present disclosure may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION

Figure 1:
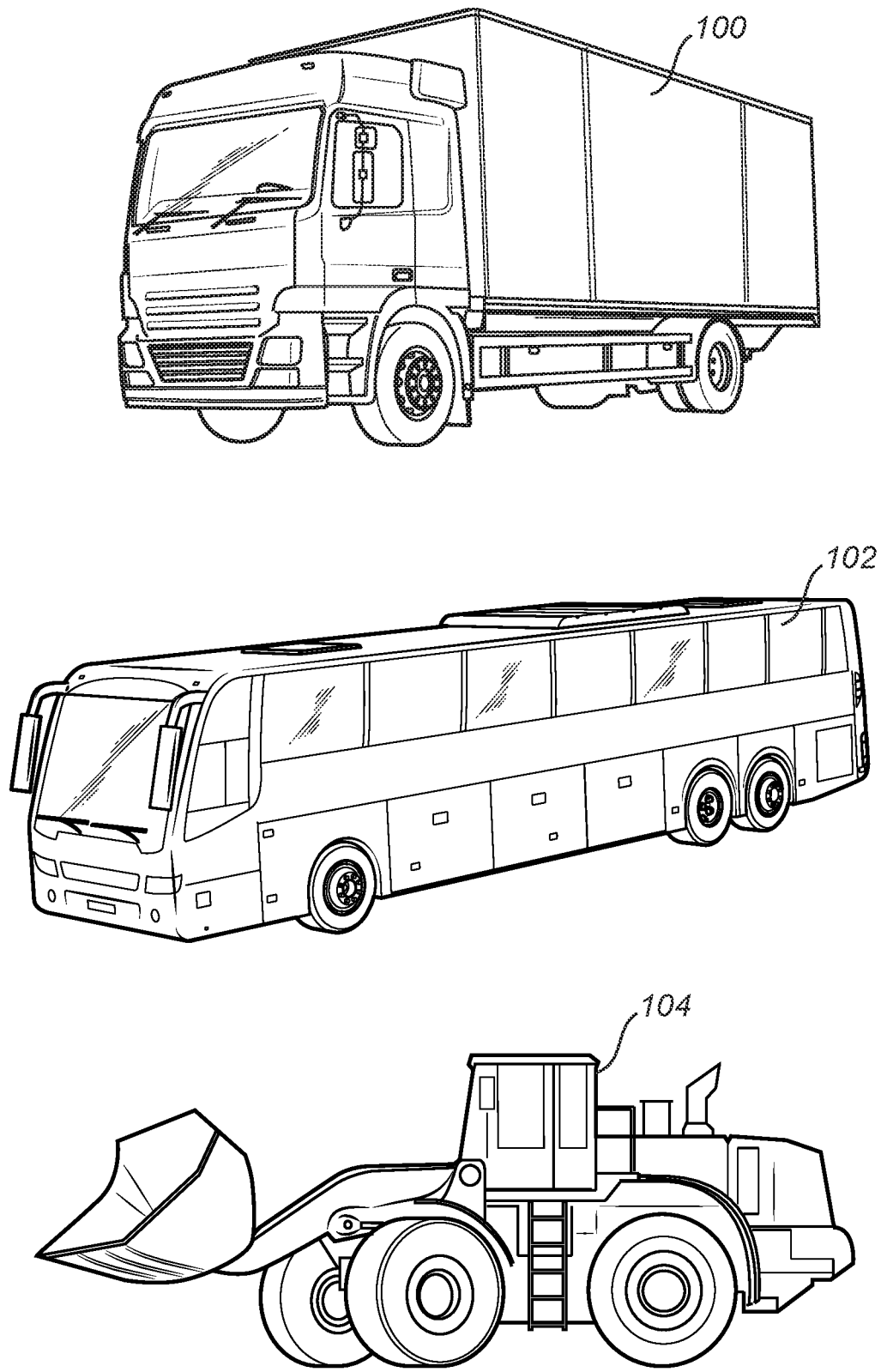
FIG. 1 illustrates a truck, a bus and a wheel loader in which the engine system according to the present disclosure may be incorporated.

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 2:
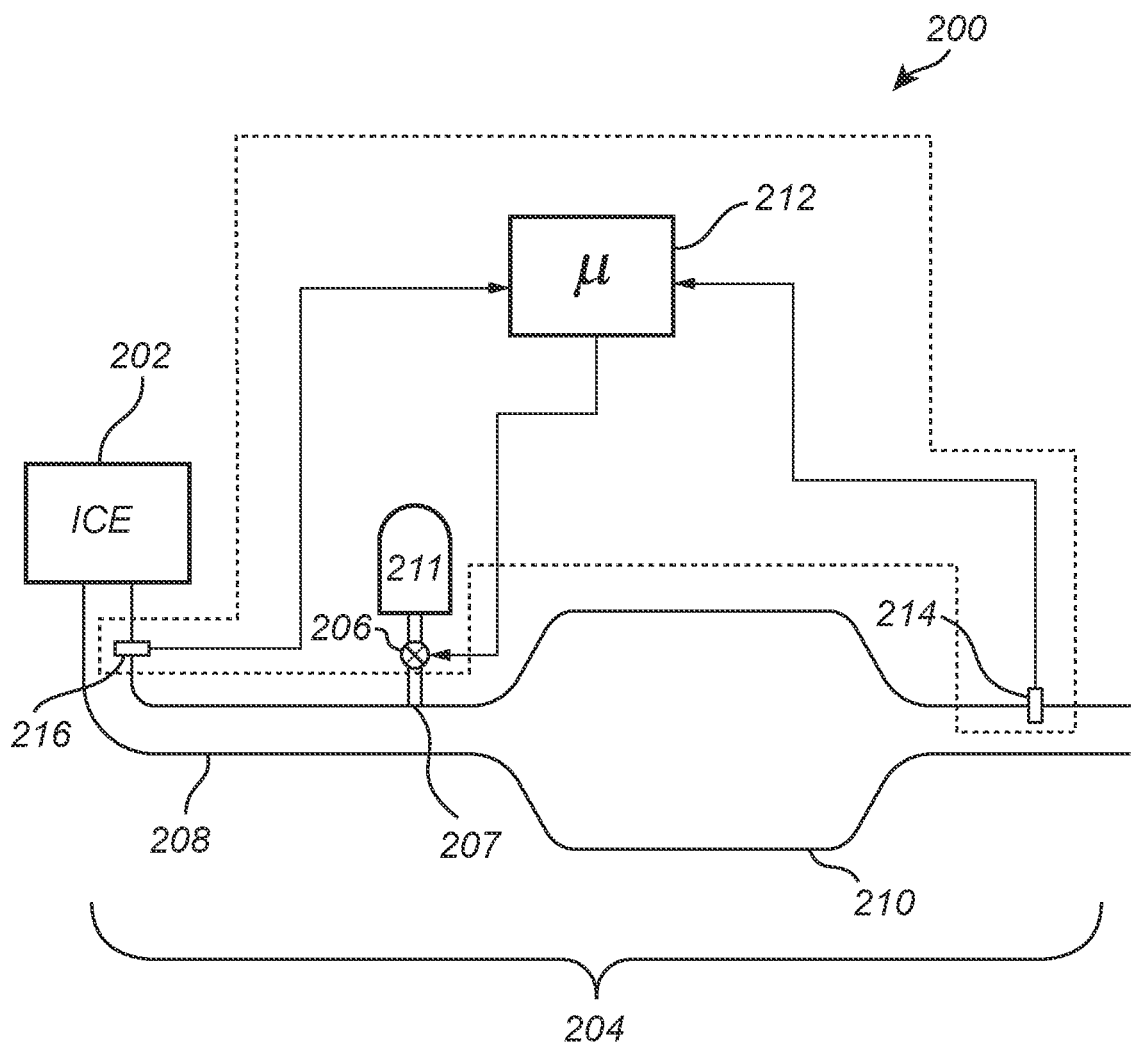
FIG. 2 conceptually illustrates a reductant injection control system for an internal combustion engine (ICE) according to a currently preferred embodiment of the present disclosure, comprised as a component of propulsion means for e.g. the vehicles as shown in FIG. 1.

Referring now to the drawings and to FIG. 1 in particular, there is depicted an exemplary vehicle, here illustrated as a truck 100, in which an engine system 200 (as shown in FIG. 2) according to the present disclosure may be incorporated. The engine system 200 may of course be implemented, possibly in a slightly different way, in a bus 102, wheel loader 104, a car, an electric generator, etc.

The vehicle may for example be either of a diesel vehicle or a hybrid vehicle, the hybrid vehicle comprising both an electrical machine and a diesel engine. The vehicle may further be manually operated, fully or semi-autonomous.

Turning now to FIG. 2, conceptually illustrating an engine system 200 according to a currently preferred embodiment of the present disclosure. In the following, the reductant is exemplified as urea, and the dosage of the reductant/urea is performed by using a urea injector 206.

The engine system 200 comprises an internal combustion engine (ICE) 202, where the ICE 202 is provided with an exhaust gas aftertreatment system (EATS) 204 arranged downstream of the ICE 202. The above-mentioned urea injector 206 is provided as a component of the engine system 200 and is arranged at a first position 207, to dose the urea to an exhaust line 208 of the ICE 202. The exhaust line 208 is in turn arranged in fluid communication with a selective catalytic reduction (SCR) catalyst 210 of the EATS 204. The SCR catalyst 210 may for example include a base metal/zeolite formulation with optimum NOx conversion performance in the range of 200-500° C. Other catalysts as mentioned above may be selectively used in relation to the present disclosure.

The engine system 200 further comprises a processing unit 212 provided for controlling the urea injector 206. The ICE 202 is generally arranged in communication with an air intake manifold (not shown) and the exhaust line 208. The further components of the ICE 202 are excluded in FIG. 2.

Reductant, such as aqueous urea, is stored in a storage vessel 211 and delivered upstream of the SCR catalyst 210 to the exhaust line 208 using the urea injector 206. The reductant is metered out by a pump through a control valve of the urea injector 206, where both the pump and the valve are controlled by the processing unit 212. Air and reductant are then injected into the exhaust line 208 in a vaporized state, whereby the vapor is introduced into an exhaust gas mixture when entering the SCR catalyst 210.

The engine system 200 further comprises two separate NOx sensors, where a first NOx sensor 214 is downstream, and second NOx sensor 216 is arranged upstream of the SCR catalyst 210. Both the second and the first NOx sensor 216, 214 are coupled in the path of the exhaust gas from the ICE 202 entering and exiting the SCR catalyst 210, respectively. The outputs of these sensors 214, 216 are acquired by the processing unit 212 and used by the processing unit 212, for example for controlling the urea injector 206 as well as for determining a NOx conversion efficiency of the SCR catalyst 210.

The EATS 204 preferably also comprises a particulate filter (not shown) arranged upstream of the SCR catalyst 210 and used to trap particulate matter (such as soot) generated during operation of the ICE 202, thereby preventing the SCR from filling up with soot and ash. The particulate filter can be manufactured from a variety of materials including cordierite, silicon carbide, and other high temperature oxide ceramics. Additionally, EATS 204 preferably comprises a Diesel Oxidation Catalyst (DOC) (not shown).

The processing unit 212 may for example be an electronic control unit (ECU), comprised with the vehicle 100, 102, 104, possibly manifested as a general-purpose processor, an application specific processor, a circuit containing processing components, a group of distributed processing components, a group of distributed computers configured for processing, a field programmable gate array (FPGA), etc. The processing unit 212 may be or include any number of hardware components for conducting data or signal processing or for executing computer code stored in memory. The memory may be one or more devices for storing data and/or computer code for completing or facilitating the various methods described in the present description. The memory may include volatile memory or nonvolatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Figure 3:
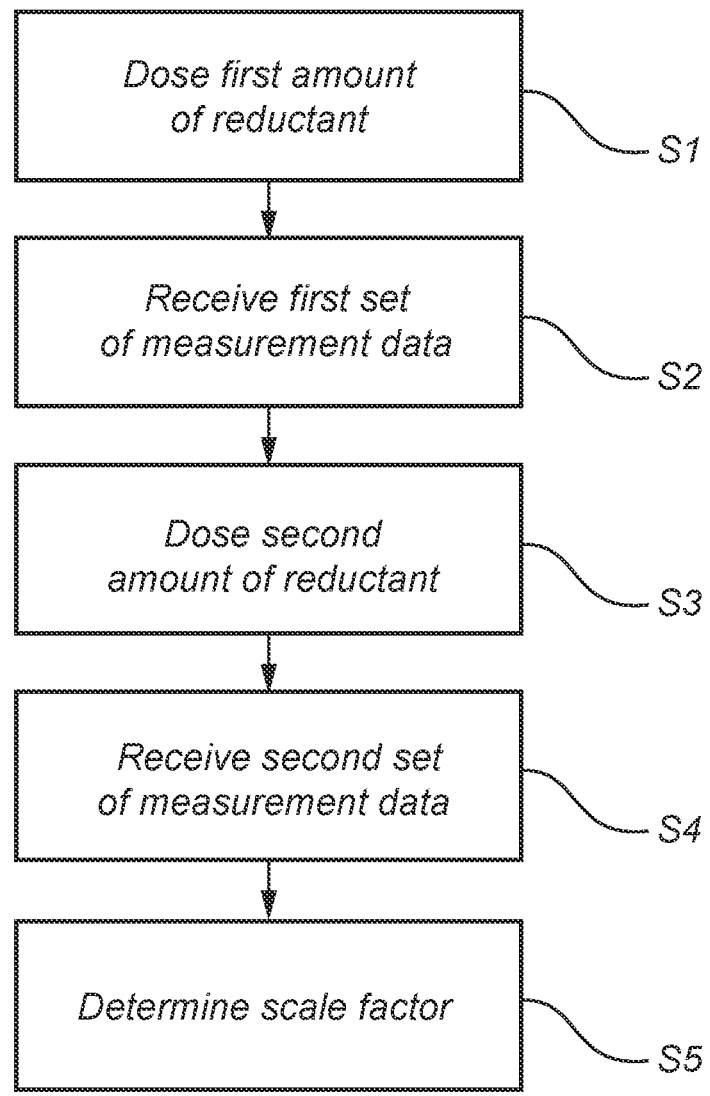
FIG. 3 shows a flow chart of a method according to an embodiment of the present disclosure.

During operation of the engine system 200, with further reference to FIG. 3, the sensor analysis process according to the present disclosure comprises dosing, S1, under control of the processing unit, 102, a first amount of the urea (or any other form of suitable reductant) into the exhaust gases generated by the ICE 202 using the urea injector 206. As illustrated in FIG. 2, the first position 207 is arranged upstream of the first NOx sensor 214 as seen from the ICE 202. The ICE 202 is at this point operated to generate a first essentially constant flow of NOx (with a fluctuation of no more than +/−10%), such as by keeping the revolutions per minute (RPM) of the ICE 202 essentially constant while delivering an essentially constant torque.

The processing unit 212 will at this point start receiving, S2, a first set of measurement data from the first NOx sensor 214 indicative of an amount of NOx in the exhaust gases at the position of the first NOx sensor 214. It may in some embodiments be desirable to maintain this state of operation (i.e. first essentially constant flow of NOx while dosing the first amount of the urea) for a predefined period of time (such as for example between 10-120 seconds) to ensure that the first set of measurement data from the first NOx sensor 214 generated by the first NOx sensor 214 stabilizes within a maximum variance (such as a maximum variance of 5-10%). It may also be possible to introduce a filtering function with the processing unit 212 to "smooth" out the first set of measurement data, i.e. for removal of possible unwanted disturbance generated by the first sensor 214.

Typically, but not necessarily, when a stabilized first set of measurement data has been received from the first NOx sensor 214, the sensor analysis proceeds by dosing, S3, a second amount of the urea into the exhaust gases using the urea injector 206. Again, the operation of the ICE 202 is maintained to ensure that the ICE 202 produces the first constant flow of NOx. Similarly to the above, the processing unit 212 at this point in time receives, S4, a second set of measurement data from the first NOx sensor 214. However, at this point in time the second set of measurement data will be indicative of the amount of NOx in the exhaust gases at the position of the first NOx sensor 214 when the second amount of the urea is dosed into the exhaust gases from the ICE 202.

When the ICE/EATS implementation has been operated at these two different states (i.e. constant flow of NOx but with two different urea dosage flows), and the processing unit 212 has received the two different (i.e. first and second) sets of measurement data from the first NOx sensor 214, it is possible to proceed by determining, S5, a scale factor for the first NOx sensor 214.

This determination of the scale factor for the first NOx sensor 214 is performed by processing a combination of the first amount of the reductant, the second amount of the reductant, the first set of measurement data, the second set of measurement data, and a predefined NOx conversion ratio for the first and the second amount of the reductant.

For example, the predefined NOx conversion ratio is 80% for a specific implementation of the EATS 204. This information in combination with the well-known chemical relation of needing approximately 0.80 g/s of an aqueous urea solution with 32.5% urea and 67.5% deionized water (such as AdBlue) to convert 0.40 g/s of NOx. That is, for each "part" of NOx comprised with the exhaust gases, approximately two "parts" of the above specified aqueous urea solution is needed to reduce the NOx levels within the exhaust gases with 80%.

Accordingly, in case of operating the ICE 202 such at the first constant flow of NOx and selecting the first amount of urea to be dosed into the exhaust to be zero, then the first set of real measurement data from the first NOx sensor 214 can be expressed as $N_{11}$. When then operating the ICE 202 such at the second constant flow of NOx and selecting the second amount of urea to be dosed into the exhaust to be expressed as X, then the second set of expected measurement data from the first NOx sensor 214 can be expressed as $N_{21}$.

If the first constant flow of NOx is expressed as 1.00, then with zero dosage of urea the expected amount of NOx at the first NOx sensor 214 will be $N_{12}$=1.00 g/s. If then the second amount of urea is selected to e.g. 0.80 g/s, the expected amount of NOx at the first NOx sensor 214 will be $N_{22}$=0.60 g/s, since 0.80 g/s of urea is expected (i.e. the predefined NOx conversion ratio) to reduce the amount of NOx at the first NOx sensor 214 with 0.40 g/s following the discussion above.

If for example the first NOx sensor 214 has a measuring scale error of −20%, then this can be expressed as a scale factor of 0.8. This scale factor is then to be compared to a sensor without error, i.e. having a scale factor of 1.0. The first set of real measurement data from the first NOx sensor 214, i.e. $N_{11}$, will then result in a measurement of 0.80 g/s and the second set of real measurement data from the first NOx sensor 214, i.e. $N_{21}$, results in a measurement of 0.48 g/s. Based on this information, the following expression may be defined:

$$\text{Scale factor first } NOx \text{ sensor} = \frac{(N_{11} - N_{21})}{(N_{12} - N_{22})} = \frac{0.80 - 0.48}{1.00 - 0.60} = 0.8$$

Accordingly, in this specific example the scale factor for the first NOx sensor 214 is determined to be 0.8. It should of course be understood that this specific example is just provided for exemplifying how the sensor analysis process according to the present disclosure may be executed by the processing unit 212. Other possible predefined NOx conversion ratios are of course possible and within the scope of the present disclosure, Such different predefined NOx conversion ratios may for example be dependent on the EATS/SCR used in conjunction with the ICE 202.

The above discussion about the engine control system according to the present discourse has been made in relation to an implementation where the EATS comprises only a single SCR catalyst. It should however be understood that the presented engine control system may be used also in relation to an implementation comprising more than a single SCR catalyst, such as two SCR catalysts. It should also be understood that some implementations may comprise more than just two NOx sensors, for example when the implementation comprises more than a single SCR catalyst.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A computer implemented method for sensor analysis in an exhaust gas aftertreatment system (EATS), wherein:
    the EATS is coupled downstream of an internal combustion engine (ICE) and provided for treating exhaust gases from the ICE, and
    the EATS or the ICE comprises a processing unit,
wherein the method comprises:
    dosing, under control of the processing unit, a first amount of a reductant into the exhaust gases at a first position upstream of a first nitrogen oxide (NOx) sensor comprised with the EATS when operating the ICE at a first constant flow of NOx,
    receiving, at the processing unit, a first set of measurement data from the first NOx sensor indicative of an amount of NOx in the exhaust gases at the position of the first NOx sensor,
    dosing, under control of the processing unit, a second amount of the reductant into the exhaust gases at the first position when operating the ICE at the first constant flow of NOx,
    receiving, at the processing unit, a second set of measurement data from the first NOx sensor indicative of an amount of NOx in the exhaust gases at the position of the first NOx sensor, and
    determining, using the processing unit, a scale factor for the first NOx sensor based on a combination of:
        the first amount of the reductant, wherein the first amount of the reductant is zero,
        the second amount of the reductant,
        the first set of measurement data,
        the second set of measurement data, and
        a predefined NOx conversion ratio for the first and the second amount of the reductant,
    wherein a second NOx sensor is arranged upstream of the first position and the method further comprises the steps of:
        receiving, at the processing unit, a third set of measurement data from the second NOx sensor indicative of an amount of NOx in the exhaust gases at the position of the second NOx sensor when operating the ICE at the first constant flow of NOx and dosing the first amount of the reductant,
        receiving, at the processing unit, a fourth set of measurement data from the second NOx sensor indicative of an amount of NOx in the exhaust gases at the position of the second NOx sensor and a fifth set of measurement data from the first NOx sensor indicative of an amount of NOx in the exhaust gases at the position of the first NOx sensor when operating the ICE at a second constant flow of NOx and dosing the first amount of the reductant, and
        determining, using the processing unit, a scale factor for the second NOx sensor based on a combination of:
            the first amount of the reductant,
            the third set of measurement data,
            the fourth set of measurement data,
            the fifth set of measurement data, and
            the scale factor for the first NOx sensor,
    wherein the scale factors for the first and the second NOx sensor are indicative of a measuring scale error for the first and the second NOx sensor, respectively.

2. The method according to claim 1, wherein the second amount of the reductant is higher than the first amount of the reductant.

3. The method according to claim 1, wherein the second constant flow of NOx is higher or lower than the first constant flow of NOx.

4. The method according to claim 1, wherein the reductant is urea.

5. The method according to claim 1, wherein the ICE when operated at the first constant flow of NOx produces a constant amount of NOx per time unit.

6. An engine system, comprising:
    an internal combustion engine (ICE),
    an exhaust gas aftertreatment system (EATS) coupled downstream of the ICE and provided for treating exhaust gases from the ICE,
    a first nitrogen oxide (NOx) sensor, and
    a processing unit,
wherein the processing unit is arranged to:
    dose a first amount of a reductant into the exhaust gases at a first position upstream of a first nitrogen oxide (NOx) sensor comprised with the EATS when operating the ICE at a first constant flow of NOx, receive a first set of measurement data from the first NOx sensor indicative of an amount of NOx in the exhaust gases at the position of the first NOx sensor, dose a second amount of the reductant into the exhaust gases at the first position when operating the ICE at the first constant flow of NOx, receive a second set of measurement data from the first NOx sensor indicative of an amount of NOx in the exhaust gases at the position of the first NOx sensor, and determine a scale factor for the first NOx sensor based on a combination of:
the first amount of the reductant, wherein the first amount of the reductant is zero,
the second amount of the reductant,
the first set of measurement data,
the second set of measurement data, and
a predefined NOx conversion ratio for the first and the second amount of the reductant, further comprising a second NOx sensor arranged upstream of the first position, wherein the processing unit is further arranged to:
receive a third set of measurement data from the second NOx sensor indicative of an amount of NOx in the exhaust gases at the position of the second NOx sensor when operating the ICE at the first constant flow of NOx and dosing the first amount of the reductant,
receive, at the processing unit, a fourth set of measurement data from the second NOx sensor indicative of an amount of NOx in the exhaust gases at the position of the second NOx sensor and a fifth set of measurement data from the first NOx sensor indicative of an amount of NOx in the exhaust gases at the position of the first NOx sensor when operating the ICE at a second constant flow of NOx and dosing the first amount of the reductant, and
determine, using the processing unit, a scale factor for the second NOx sensor based on a combination of:
the first amount of the reductant,
the third set of measurement data,
the fourth set of measurement data,
the fifth set of measurement data, and
the scale factor for the first NOx sensor, wherein the scale factors for the first and the second NOx sensor are indicative of a measuring scale error for the first and the second NOx sensor, respectively.

7. The engine system according to claim 6, wherein the reductant is dosed at the first position using an injector arrangement.

8. The engine system according to claim 6, wherein the second amount of the reductant is higher than the first amount of the reductant.

9. A vehicle, comprising an engine system according to claim 6.

10. The vehicle according to claim 9, wherein the vehicle is at least one of a truck and a working machine.

* * * * *